United States Patent
Cumpston, Jr.

[11] 3,771,647
[45] Nov. 13, 1973

[54] SOLID WASTE OPENING MACHINE
[76] Inventor: Edward H. Cumpston, Jr., 43 Monument Ave., Old Bennington, Vt. 05201
[22] Filed: Apr. 19, 1972
[21] Appl. No.: 245,618

Related U.S. Application Data
[63] Continuation-in-part of Ser. No. 101,867, Dec. 28, 1970, abandoned.

[52] U.S. Cl............ 209/73, 209/120, 198/220 DA, 198/209
[51] Int. Cl............................................ B07b 13/10
[58] Field of Search ............... 241/79, 275; 209/73, 209/74, 115, 119, 120; 198/220 DA, 128, 209

[56] References Cited
UNITED STATES PATENTS

| | | | |
|---|---|---|---|
| 2,905,311 | 9/1959 | Marchetti..................... | 198/220 DA |
| 3,320,528 | 5/1967 | Esenwein..................... | 198/220 DA |
| 1,600,037 | 9/1926 | Bullard........................... | 209/120 |
| 1,358,375 | 11/1920 | Koch............................. | 209/120 X |
| 3,463,311 | 8/1969 | Coneybear et al............. | 209/119 X |
| 2,357,843 | 9/1944 | Morrissey....................... | 241/275 |

Primary Examiner—Allen N. Knowles
Attorney—Cumpston, Shaw and Stephens

[57] ABSTRACT

A chute spreads and feeds stacks or piles of waste material to a machine that passes the mixed solid waste material over the surface of an inclined, rotating disk that has evacuated perforations for gripping some of the waste material and carrying it around the disk. A vacuum box under the disk extends in an arc part way around the disk from the inlet toward the outlet of the machine to create the vacuum near the inlet for carrying material around the disk and to release the vacuum near the outlet. Released material is thrown against an impact wall positioned beyond the vacuum box, and an air blast is directed along the impact wall and through the outlet of the machine. The effect is to spread and open some of the solid waste material, particularly the reusable paper.

38 Claims, 9 Drawing Figures

३,७७१,६४७

SOLID WASTE OPENING MACHINE

RELATED APPLICATIONS

This application is a continuation-in-part of my U.S. Pat. application Ser. No. 101,867, now abandoned filed on Dec. 18, 1970, entitled SOLID WASTE OPENING MACHINE, and abandoned upon the filing of this application.

BACKGROUND OF THE INVENTION

There is a need for sorting solid waste material so that some of it can be reused. Much of municipal solid waste material is reusable and valuable if accurately sorted, but spreading, opening, separating, and sorting processes have not been successful for automatic, high-volume sorting of municipal waste. Hence, much of the waste material is lost, and valuable resources are consumed in replacing it.

THE INVENTIVE IMPROVEMENT

The invention involves an analysis of the most expedient methods for spreading, opening, and sorting solid waste material and proposes a specifically successful machine for spreading and opening waste material before sorting. With proper spreading and opening, wase paper can be sorted out from other waste by an air sweep classifier, and with the proper parameters in the opening machine and the air sweep, even magazines can be sorted out from waste newspaper. One of the accomplishments of the inventive machine is thus to spread and open waste material so that waste newspaper can be recovered separately from other municipal waste and recycled. Known processes are available for recycling waste newspapers, and if it is sorted clean from other waste materials, its present value is up to $30 per ton. Furthermore, recycling of waste newspaper material can save thousands of trees per day.

Some of the factors considered in the inventive analysis of the problem of sorting solid waste material are as follows. Sorting is essential to recycling of solid waste material, and the more thorough the sorting, the more valuable sorted materials become, because of the increasing ease of their reuse. The invention is based on the premise that sorting is best accomplished when the various materials involved are as close to their original state as possible, to preserve criteria that aid in the sorting process.

The cost of burning or burying mixed solid waste is significant and is presently on the order of $8 per ton. This same mixed waste usually contains a high percentage of valuable and reusable natural resources. The increasing scarcity of both dumping grounds and many natural resources makes it essential for use to find ways of recycling as much of our solid wastes as possible. Mixed solid wastes are a liability until they are sorted into like materials that are reusable, and the commercial value of the waste material is closely related to the purity of the sorting. At present two sorting methods are in limited use. Hand-sorting on a moving belt has been used for years, but is slow, often unreliable, and increasingly more expensive. Machine-sorting has so far been tried only on pre-shredded, mixed waste. Some of these machines sort large volumes at low cost, but the purity of the sorting is poor. A newspaper, a magazine and a plastic bag don't look at all alike until they are shredded. As mixed together they make a low-grade landfill, but sorted apart they are reusable and presently worth up to $30 per ton if the purity is high.

A key step in sorting and recycling of solid waste material is opening and spreading the material so that it can be uniformly evaluated by the sorting equipment. The inventive machine accomplishes this opening and spreading by means of a perforated disk rotating over a vacuum box to selectively grip and spread some of the solid waste material and spread or open up folded flat material mixed into the solid waste. The inventive machine prepares the solid waste material so that a subsequent air sweep classifier can remove the approximately 50 percent of municipal solid waste that is valuable and reusable paper without destroying any of the sortable characteristics of the materials rejected by the air sweep.

The purpose of this invention is to perform the essential initial step of opening and spreading mixed waste for sorting, and the objectives include: opening and spreading solid waste material in such a way that when presented to an air sweep separator, the paper that comprises up to 50 percent of municipal solid waste is separated from the other solid waste with sufficient purity to become a valuable resource. The paper is spread out and opened up so that its distinguishable character is determined by the air sweep. The invention also aims to avoid mixing of solid waste material and to preserve sortable characteristics of all materials for several subsequent sorting steps and the invention seeks high-volume capacity and low cost; capacity to pass all sorts of materials without difficulty, even including objects such as kitchen sinks; compatability with conveyor feeds and air sweep sorters; and operation without manual supervision and with minimum maintenance.

SUMMARY OF THE INVENTION

These objectives are accomplished in an opening and spreading machine that has a housing forming a cavity generally inclined approximately mid way between vertical and horizontal with an inlet for waste material near the top of the cavity and an outlet near the bottom of the cavity. A circular flat disk at least three feet in diameter is rotated in the housing between the inlet and the outlet to form a substantial part of the floor of the cavity. The radially outer region of the disk is perforated, and a vacuum box is arranged closely under the disk to extend in an arc part way around the disk from the inlet toward the outlet in the direction of rotation of the disk.

The disk is preferably about five feet in diameter and is preferably driven at a peripheral velocity of about 1,600 feet per minute. The outer one-third of the disk is perforated for gripping flat material contacting the top surface of the disk, and preferably a vacuum of 10 to 12 inches of water is used. The effect is that papers placed on the disk are dealt from the bottom and rapidly spread out around the disk by the combination of vacuum grip on the bottom paper and the disk velocity. At the end of the vacuum box arc, the vacuum is interrupted so that the papers that have been held and carried around the disk are thrown off by centrifugal force. An impact wall is arranged beyond the vacuum box so that papers are thrown against the wall, and an air blast is directed along the impact wall through the outlet of the cavity to help open papers and to sweep the impact wall clear to prevent any pile-up. The combination of impact against the wall and the air blast blowing along the wall separates and opens up papers sufficiently to dislodge materials that may be folded in with the papers.

The approximately 45° incline of the disk and the cavity lets solid waste materials slide easily onto the disk, and those that are not gripped by the vacuum are free to slide across the disk and out of the outlet. The many perforations in the disk are relatively small in diameter so that the vacuum can be maintained even when there is no material on the disk, and a one-quarter inch diameter perforation is preferred for this. To give the vacuum a strong grip on the top surface of the disk to accelerate papers to the 1,600-feet-per-minute velocity of the disk, the perforations are countersunk in the upper surface of the disk to about three quarters of an inch in diameter to increase the vacuum grip without loss of vacuum through an excessively large hole. Such countersinking is preferably made at a relatively flat angle so as not to produce exposed edges on the disk to damage materials and interfere with subsequent sorting. An included countersink angle of 100° works well and is preferred.

The top surface of the disk is generally smooth so as not to interfere with rapid egress of materials that are not held by the vacuum. The cavity housing has an impact wall, and a peripheral retainer wall extends from the inlet around the disk to the outlet passageway. The top of the housing is preferably closed to confine the air blast and direct it along the impact wall and through the outlet passageway.

The holes in the disk are in concentric circles so that one small air jet under the disk outside the vacuum box can keep each circle of holes from plugging up.

DRAWINGS

DETAILED DESCRIPTION

Figure 1:
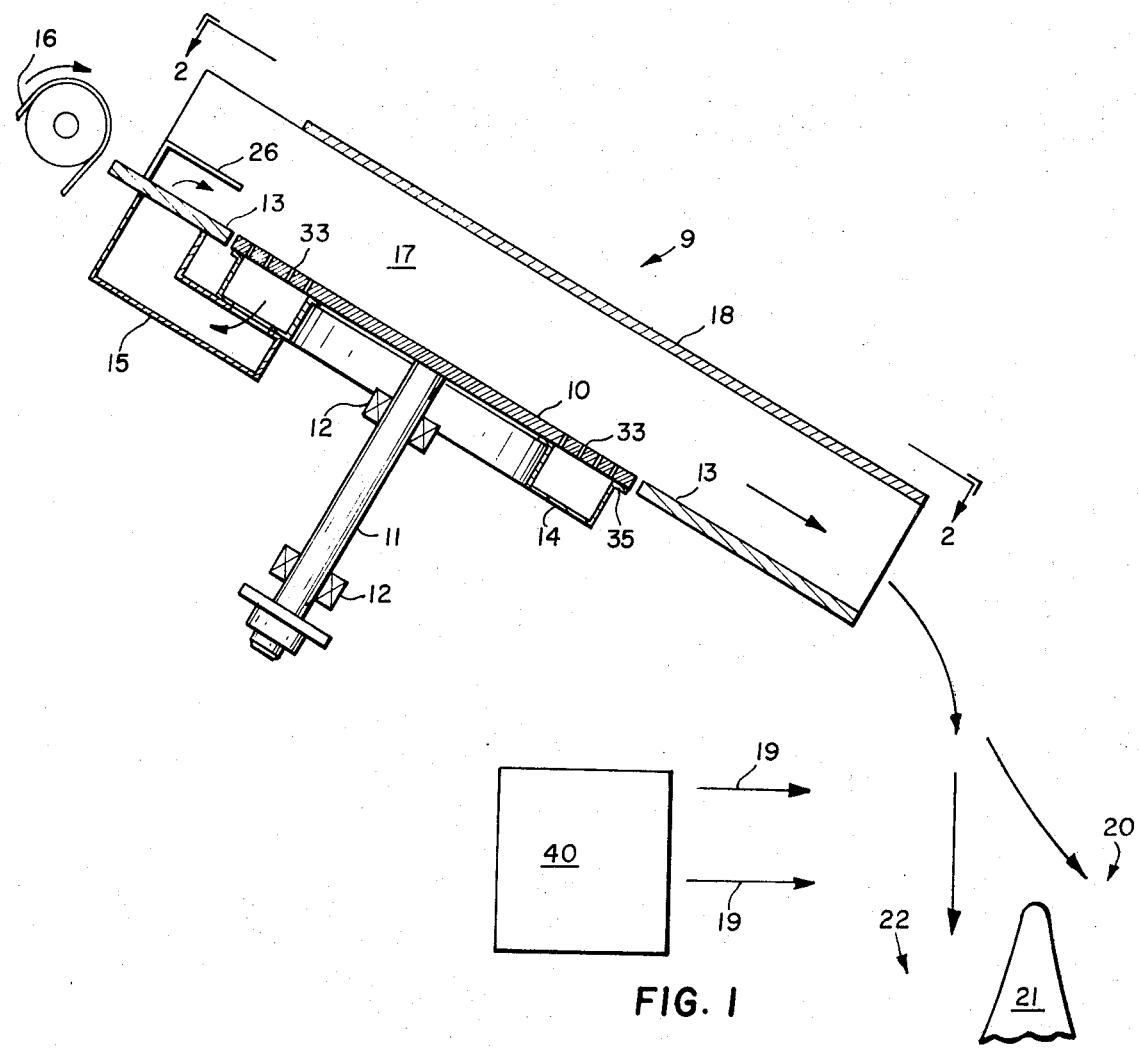
FIG. 1 is a partially schematic, vertical, cross-sectional view of the inventive machine.

As shown in the drawings, machine 9 has a housing forming a cavity 17 that is generally inclined at a 45° angle between vertical and horizontal. The bottom of cavity 17 is formed by a floor or table 13 and disk 10 which is mounted on shaft 11 and supported by bearings 12 for rotation. Disk 10 is turned by a conventional motor, gear reducer, and chain drive that are not shown. As so arranged, disk 10 forms a substantial part of the floor of cavity 17. A cover 18 closes the top of cavity 17 over disk 10, and machine 9 is supported by conventional framing that is not shown.

Conveyor 16 feeds solid waste material onto table 13 at inlet 28 it can slide down through cavity 17, over disk 10, and out through outlet 29. Vacuum box 14 and header 15 are arranged under disk 10. An air sweep sorter is positioned as shown in FIG. 1 below outlet 29 so that a blower 40 directs a uniform air flow as represented by arrows 19 horizontally through the material dropping out of cavity 17. Because of differences in size, shape and density, the accepted materials 20 are blown over divider 21 while rejected materials 22 fall short of it as represented by the arrows. By adjustment of the height of the drop, the velocity of the air sweep, and the position of divider 21, definitive sorting can be accomplished. More than one divider can be used where more than two categories are desired. This type of sorting arrangement is compatible with the inventive machine and helps fulfill the objects of the invention. Other types of sorting steps can be applied to the rejected material 22 which may amount to one-half the input weight and one-third of its volume.

Figure 2:
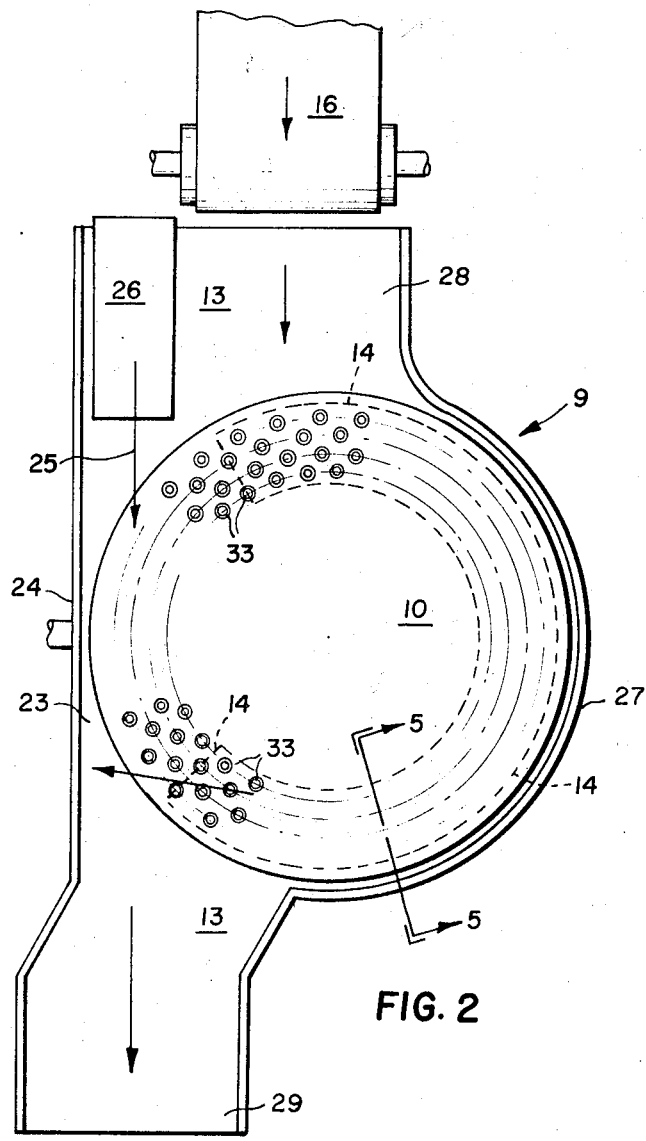
FIG. 2 is a view of the machine of FIG. 1 taken along the line 2 — 2 thereof with the housing top removed.
Figure 3:
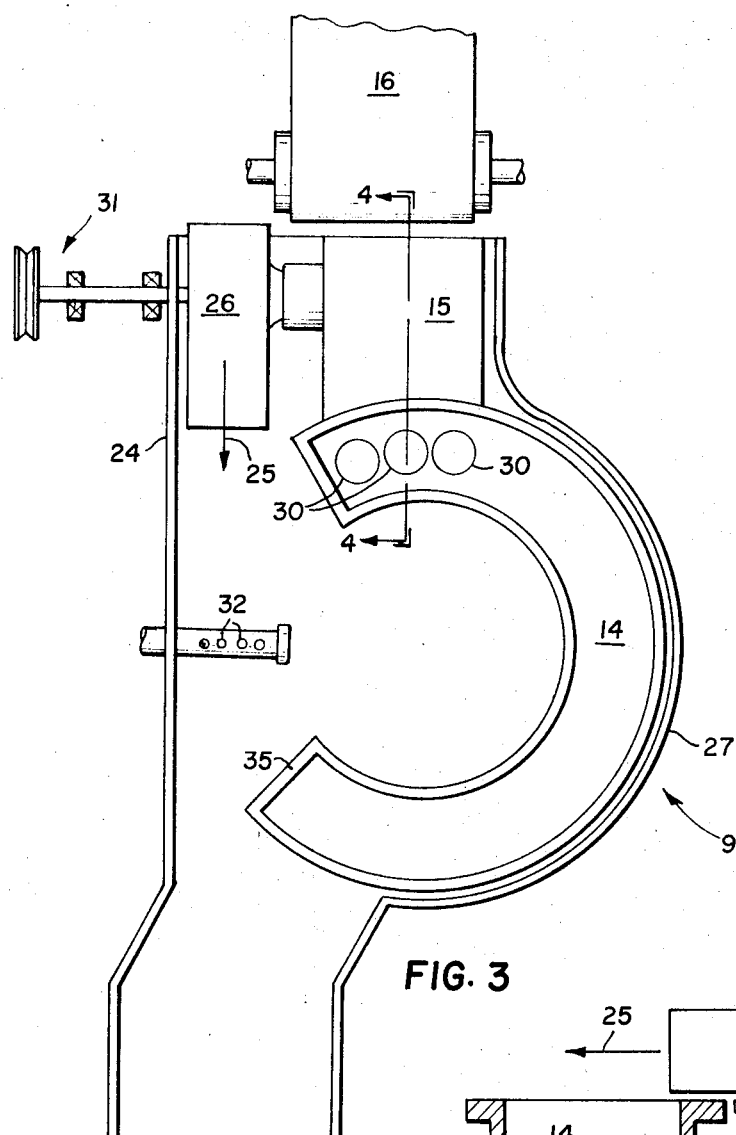
FIG. 3 is a view similar to the view of FIG. 2 but showing the inventive machine with its rotating disk removed.

As best shown in FIGS. 2 and 3, vacuum box 14 extends in an arc part way around the perforated outer region of disk 10 from inlet 28 toward outlet 29 in the clockwise direction of rotation of disk 10 as illustrated. The arc of vacuum box 14 preferably extends from 200° to 300° and is preferably about 255°. Flat materials such as paper passing over the top of disk 10 are gripped by the vacuum and carried around the arc of vacuum box 14 for spreading out such materials. At the outlet end of vacuum box 14, the materials are released from disk 10 and directed tangentially against impact wall 24 in impact area 23. An air blast 25 represented by the arrow from fan 26 is directed along wall 24 and through outlet 29 to blow material from impact area 23 out through outlet 29. Vacuum box 14 is connected to header 15 and blower 26 so that air drawn from holes 30 to evacuate vacuum box 14 is moved through header 15 and forced outward from fan 26 as air blast 25. Also a separate blower can be arranged to provide air blast 25. The drive 31 for fan 26 includes a shaft and bearings as illustrated in FIG. 3.

Air jets 32 as shown in FIG. 3 are outside of vacuum box 14 and under disk 10 to register with concentric rings of holes 33 in disk 10 for blowing preferably 80 PSI air upward to clean holes 33. Preferably the radially outer one-third of disk 10 has holes 33. Disk 10 is at least three feet in diameter, and for spreading and opening waste paper disk 10 is preferably about five feet in diameter and rotated at a peripheral speed of 1,600 feet per minute.

Figure 5:
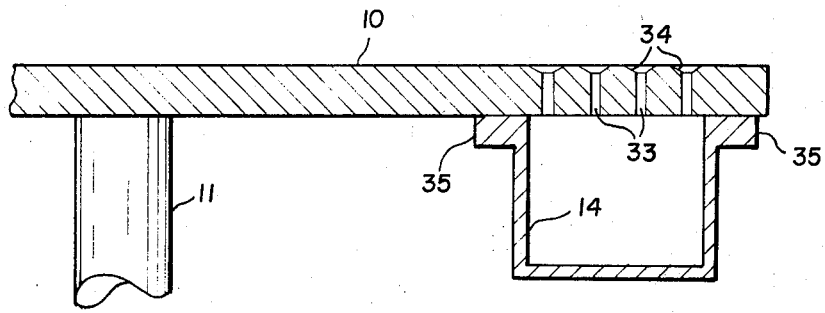
FIG. 5 is a fragmentary cross-sectional view of the machine of FIG. 2 taken along the line 5 — 5 thereof.

As best shown in FIG. 5, holes 33 in disk 10 are preferably one-quarter inch in diameter and have countersinks 34 at the top of disk 10 formed rather flat at a preferably 100° included angle as illustrated. This prevents sharp edges on the top of disk 10, and yet enlarges the vacuum gripping area of holes 33 to preferably three quarters of an inch in diameter. Sealing lips 35 of vacuum box 14 fit closely against the under surface of disk 10 as illustrated.

Figure 6:
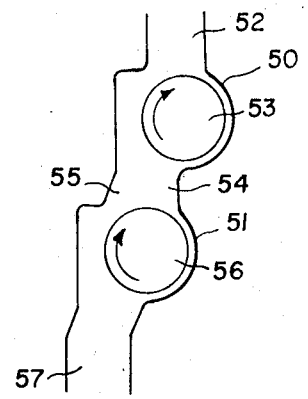
FIG. 6 is a schematic plan view of a pair of the inventive machines arranged in series.
Figure 4:
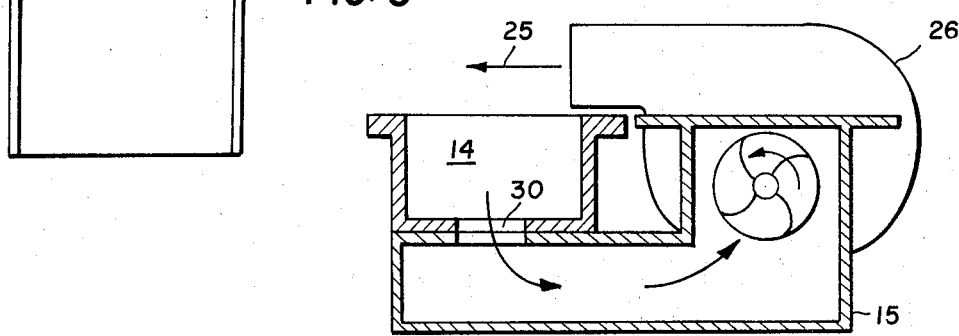
FIG. 4 is a fragmentary cross-sectional view of the machine of FIG. 3 taken along the line 4 — 4 thereof.

As best shown in FIG. 6, a pair of machines 50 and 51 that are each preferably like machine 9 as illustrated in FIG. 1 – 5 are arranged in series. Waste material is then fed to inlet 52 of machine 50 to pass over disk 53 where it is partially spread out and opened and blown out of outlet 54. Outlet 54 connects to inlet 55 of machine 51 so that material passes over disk 56 for further opening and spreading before it is blown out of outlet 57. Several machines can be arranged in series and fed at an appropriate rate so that the waste material is fully spread and opened at the final outlet of the series. Also, the output from a first machine can be sorted by a separator and only the rejected waste fed to a second machine for a higher yield.

Figure 7:
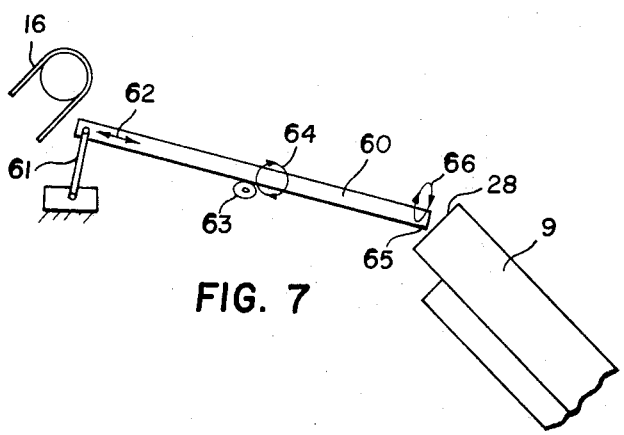
FIG. 7 is a partially schematic, elevational view of a chute for feeding and spreading solid waste material.

FIG. 7 schematically shows a preferred device for feeding and spreading material delivered to a spreading and opening machine 9 such as illustrated in FIGS. 1 – 5. Conveyor 16 delivers solid waste materials to the upper end of chute 60 which spreads such material out as it feeds toward inlet 28 of machine 9. The upper end of chute 60 is supported by pivot arm 61 that allows generally longitudinal motion of chute 60 as represented by the arrows 62. The central region of chute 60 is driven in a circular orbit by an eccentric drive 63 as indicated by the arrow 64. The free delivery end 65 of chute 60 is then driven in an elliptical path having its major axis perpendicular to chute 60 as represented by arrows 66. A radius of about three-quarters of an inch or so is preferred for eccentric drive 63, and chute 60 is preferably long enough so that its free end 65 has a vertically bouncing motion over about three inches of travel. The same general effect can be achieved by placing the eccentric drive 63 anywhere along chute 60 below the upper end and making appropriate adjustments in the eccentricity. Drive 63 is preferably placed in the central region or lower region of chute 60 and can be at the lower end of chute 60.

Since the perforated disk in machine 9 operates only on flat material contacting it, it can grip only the lowermost sheet of a stack of papers sliding onto the disk. If stacks of paper are presented rapidly to the disk in machine 9, it cannot operate fast enough to deal all the papers from the bottom and spread and open them successfully. One of the functions of chute 60 is to topple and spread stacks or piles of paper to spread out layers of paper and prevent tall stacks of paper from reaching machine 9.

The generally reciprocal, longitudinal motion of chute 60 at its upper end as represented by arrows 62, tends to topple a stack of paper dropped on the upper end of chute 60, and to spill the upper layers forward down the chute while retarding the lower layers. the surface of chute 60 is preferably formed of a high friction material to facilitate this action. The longitudinal component of motion of chute 60 is the same throughout its length, but lower regions of the chute have a gradually increasing vertical or bouncing motion that increases to a maximum at the lower end of the chute and rapidly feeds materials down the incline toward machine 9. Hence the lower end of chute 50 feeds faster than the upper end, to move spilled and spread materials rapidly along. Clockwise motion of eccentric drive 63 is preferred for such action so that chute 60 moves toward machine 9 on an up-stroke, and away from machine 9 on a down-stroke. This action is most effective in spilling, spreading, and feeding stacked or piled waste material as a generally evenly spread flow.

Figure 8:
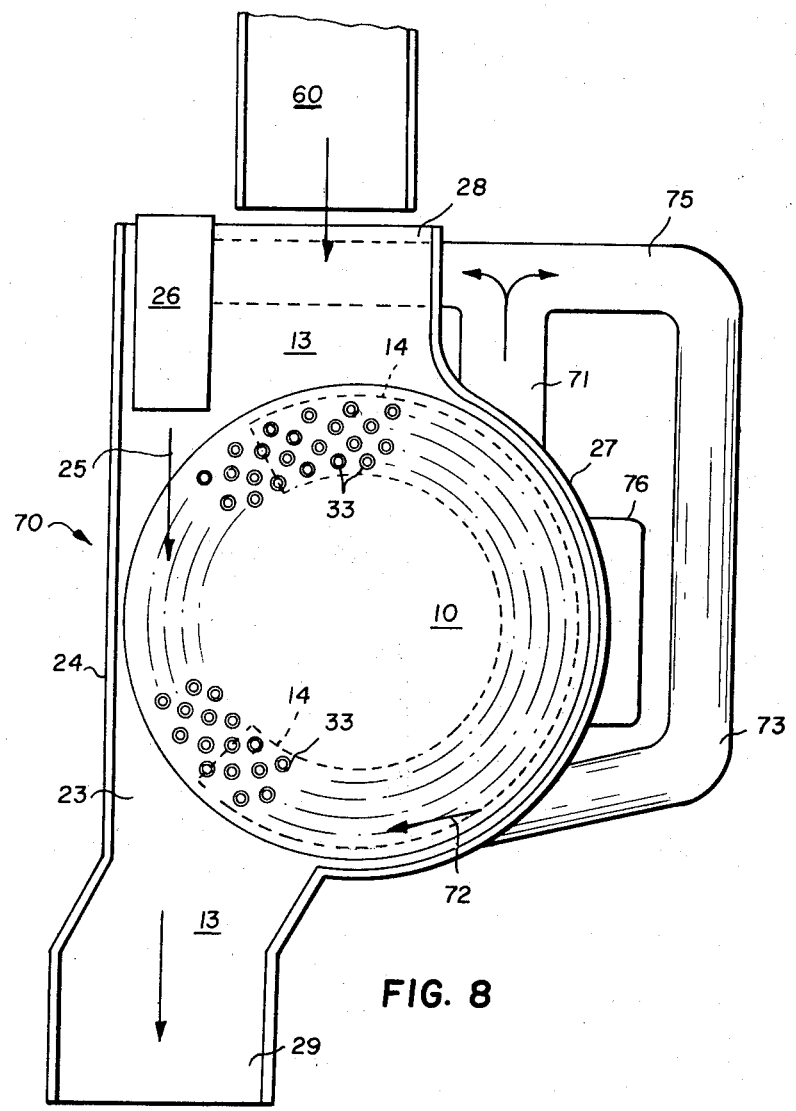
FIG. 8 is a partially schematic, plan view of another preferred embodiment of the inventive machine with the top cover removed.
Figure 9:
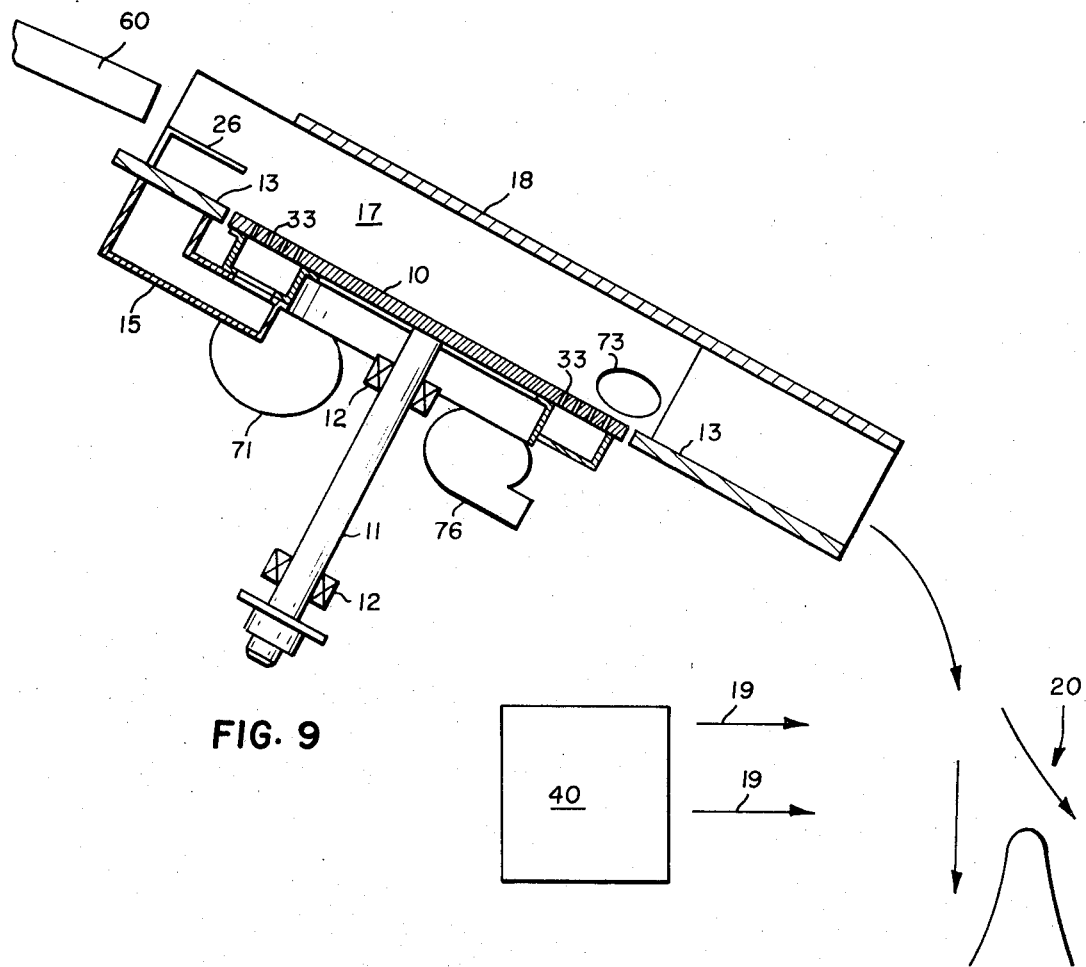
FIG. 9 is a partially cut-away elevational view of the machine of FIG. 8.

Experience with the invention since the original patent application was filed has shown that a few improvements make it work even better, and these are schematically shown in FIGS. 8 and 9. Machine 70 is basically similar to previously described machines with a rotating disk 10 having perforations 33 and a vacuum box 14. Also, the table 13 at inlet 28, impact wall 24, impact area 23, and outlet 29 are as previously described. The differences are that a blower 71 not only provides air blast 25 from nozzle 26, but also provides another air blast 72 from nozzle 73 that passes through wall 27 and extends generally tangentially of disk 10 to be directed generally against impact wall 24 at impact region 23. Air blast 72 follows wall 27 and helps move any unopened material skidding along the perimeter of disk 10 and assists disk 10 in throwing all material forcefully against wall 24 to aid in opening it up. Blower 71 preferably draws air from outside machine 70 so that its output is constant regardless of how much material is on the surface of disk 10.

The output of blower 71 is divided between a line 74 leading to nozzle 26 and a line 75 leading to nozzle 73. Preferably air blast 25 from nozzle 26 is considerably more forceful than air blast 72 from nozzle 73, and is preferably two to three times more powerful. Nozzle 73 is also preferably arranged fairly close to the surface of disk 10.

A separate blower 76 evacuates box 14 to the preferred vacuum of 10 inches of water, and the output of blower 76 is preferably directed outside the machine. A separate blower 76 for evacuating box 14 is preferred so that its variable output that changes with the amount of material on disk 10, is not required for any operation in machine 70.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate that the inventive machine can be adapted to many waste material handling circumstances, and they will understand refinements and variations in the construction and operation of such a machine within the spirit of the invention.

I claim:

1. A machine for spreading and opening mixed, solid waste material, said machine comprising:
   a. a housing forming a cavity generally inclined approximately mid way between vertical and horizontal;
   b. said housing having an inlet for said material near the top of said cavity and an outlet for said material near the bottom of said cavity;
   c. a circular, flat disk at least three feet in diameter rotatably arranged in said housing between said inlet and said outlet to form a substantial part of the floor of said cavity;
   d. a radially outer region of said disk having perforations; and
   e. a vacuum box arranged closely under said disk and extending in an arc part way around said radially outer region of said disk from said inlet toward said outlet in the direction of rotation of said disk.

2. The machine of claim 1 including means for producing an air blast directed from inside said cavity through said outlet.

3. The machine of claim 1 including an impact wall generally perpendicular to said disk and arranged beyond said vacuum box arc where material released from said disk is thrown against said impact wall.

4. The machine of claim 3 wherein said impact wall is outside the perimeter of said disk and leads into said outlet.

5. The machine of claim 4 including means for producing an air blast directed along said impact wall and through said outlet.

6. The machine of claim 1 wherein said housing is closed over the top of said disk and said outlet.

7. The machine of claim 1 including means for rotating said disk at a peripheral velocity of approximately 1,600 feet per minute.

8. The machine of claim 1 including means for evacuating said vacuum box to a vacuum of at least 10 inches of water.

9. The machine of claim 1 wherein perforations are approximately one quarter of an inch in diameter and are countersunk into the top of said disk to approximately three quarters of an inch in diameter.

10. The machine of claim 9 wherein the included angle of said countersinks is approximately 100°.

11. The machine of claim 1 wherein said arc of said vacuum box is between 200° and 300°.

12. The machine of claim 1 wherein said perforations are arranged in concentric circles, and a plurality of air jets are arranged under said disk outside said vacuum box and registered with said concentric circles for cleaning out said perforations.

13. The machine of claim 1 wherein said housing includes a wall generally perpendicular to said disk and extending closely around the periphery of said disk from said inlet to said outlet.

14. A pair of the machines of claim 1 arranged in series with said outlet from a first one of said machines leading to said inlet for a second one of said machines.

15. The machine of claim 1 including an air sweep arranged beyond said outlet for sorting said material.

16. The machine of claim 1 including an impact wall generally perpendicular to said disk and arranged beyond said vacuum box arc where material released from said disk is thrown against said impact wall, and means for producing an air blast directed along said impact wall to open and clear away material thrown against said impact wall.

17. The machine of claim 16 wherein said impact wall is outside the perimeter of said disk and leads into said outlet, and said air blast is directed into said outlet.

18. The machine of claim 17 wherein said housing is closed over the top of said disk and said outlet and includes a wall generally perpendicular to said disk and extending closely around the periphery of said disk from said inlet to said outlet.

19. The machine of claim 18 including a first blower for producing said air blast, and a second blower for evacuating said vacuum box.

20. A pair of the machines of claim 19 arranged in series with the output from a first one of said machines fed to a second one of said machines.

21. the machine of claim 19 wherein said perforations are arranged in concentric circles and a plurality of air jets are arranged under said disk outside said vacuum box and registered with said concentric circles for cleaning out said perforations.

22. The machine of claim 21 including means for rotating said disk at a peripheral velocity of approximately 1,600 feet per minute, said second blower is arranged for evacuating said vacuum box to a vacuum of at least 10 inches of water, said perforations are approximately one quarter of an inch in diameter and are countersunk into the top of said disk to approximately three quarters of an inch in diameter.

23. The machine of claim 22 wherein the arc of said vacuum box is between 200° and 300° and the included angle of said countersinks is approximately 100°.

24. A pair of the machines of claim 23 arranged in series with the output from a first one of said machines fed to a second one of said machines.

25. The machine of claim 1 including:
   a. a chute arranged for directing said material into said inlet;
   b. said chute being inclined downwardly toward said inlet;
   c. pivot means for supporting the upper end of said chute to allow motion of said chute generally longitudinally thereof; and
   d. an eccentric drive having an axis transverse to said chute and engaging said chute below said pivot means for driving the lower end of said chute in orbital path.

26. The machine of claim 25 wherein said eccentric drive rotates to move said chute toward said inlet during an upper portion of travel and away from said inlet during a lower portion of travel.

27. The machine of claim 26 wherein said eccentric drive engages said chute in a central region of said chute.

28. The machine of claim 17 including means for producing another air blast approximately tangential to said disk and directed generally toward said impact wall.

29. The machine of claim 28 wherein said outlet air blast is more forceful than said tangential air blast.

30. The machine of claim 28 including a first blower for powering said air blasts, and a second blower for evacuating said vacuum box.

31. The machine of claim 30 wherein said housing is closed over the top of said disk, said impact wall is outside the perimeter of said disk and leads into said outlet, and a wall generally perpendicular to said disk extends closely around the periphery of said disk from said inlet to said outlet.

32. The machine of claim 31 wherein said tangential air blast is delivered through said peripheral wall to move toward said impact wall.

33. The machine of claim 28 including a downwardly inclined chute arranged for spreading and feeding stacks or piles of said solid waste material into said inlet of said cavity; means for supporting the upper end of said chute for pivotal movement longitudinally of said chute to shake said waste material in a reciprocal motion to topple stacks and spread piles; and means for driving a lower region of said chute in a circular orbit to move said upper end of said chute in said longitudinal movement and to drive the lower end of said chute in an orbital motion so the feeding rate of said waste material increases toward said lower end of said chute.

34. The machine of claim 33 wherein said driving means moves said chute downward in the upper portion of said circular orbit, and moves said chute upward in the lower portion of said circular orbit.

35. The machine of claim 34 wherein said driving means drives a central region of said chute.

36. A machine for spreading and feeding stacked or piled solid waste material, said machine comprising:
   a downwardly inclined chute;

b. means for supporting the upper end of said chute for pivotal, reciprocal movement longitudinally of said chute to shake said waste material back and forth to topple stacks and spread piles; and
c. means spaced down said chute in a region below said upper end support means for driving said lower region of said chute in a circular motion in a vertical plane parallel with said chute, said circular motion of said lower region having the effect of moving said upper end of said chute in said longitudinal, reciprocal movement and moving regions of said chute below said upper end in motions having an amplitude that is perpendicular to said chute and increases with distance from said upper end of said chute so the feeding rate of said waste material increases toward said lower end of said chute.

37. The machine of claim 36 wherein said driving means rotates to move said chute longitudinally downward during the upper half of said circular motion and longitudinally upward during the lower half of said circular motion.

38. The machine of claim 37 wherein said lower region of said chute driven by said driving means is a central region of said chute, with the effect of moving the bottom end of said chute in an elliptical motion in a vertical plane parallel with said chute, said elliptical motion having a minor axis parallel with said chute and equal to the diameter of said circular motion and a major axis perpendicular to said chute and exceeding the diameter of said circular motion.

* * * * *